United States Patent [19]

Hosotani

[11] Patent Number: 4,909,527

[45] Date of Patent: Mar. 20, 1990

[54] STEERING SYSTEM WITH KICKBACK CONTROL ARRANGEMENT

[75] Inventor: Takashi Hosotani, Kawasaki, Japan

[73] Assignee: Nissan Motor Co., Ltd., Yokohama, Japan

[21] Appl. No.: 239,901

[22] Filed: Sep. 2, 1988

[30] Foreign Application Priority Data

Sep. 2, 1987 [JP] Japan .................................. 62-219878
Sep. 11, 1987 [JP] Japan .................................. 62-228852

[51] Int. Cl.⁴ .............................................. B62D 1/00
[52] U.S. Cl. ................................................... 280/88
[58] Field of Search ................... 280/88, 760; 188/192, 188/152; 180/79

[56] References Cited

U.S. PATENT DOCUMENTS 4,265,180 5/1981 Uozumi .................. 280/89

FOREIGN PATENT DOCUMENTS 62-4468 1/1987 Japan .

Primary Examiner—Richard A. Bertsch
Attorney, Agent, or Firm—Foley & Lardner, Schwartz, Jeffery, Schwaab, Mack, Blumenthal & Evans

[57] ABSTRACT

A steering system with a kickback control arrangement is disclosed which is particularly suitable for an industrial vehicle such as a forklift truck with a dirigible rear wheel or wheels. A steering force transmitting system is operatively disposed between a manual steering handle and a dirigible wheel whereby the dirigible wheel is steered by the manual steering handle. This steering force transmitting system includes a force transmitting part, such as a steering shaft assembly and/or a pinion assembly, which has one end subjected to a steering force (a steering torque) manually imposed on the manual steering handle and an opposite end subjected to an external force (a kickback) imposed on the dirgible wheel. A torque sensor and a rotation sensor are arranged on the force transmitting part and a brake is arranged as to decelerate the manual steering handle when a kickback is detected based on the outputs of the sensors.

10 Claims, 13 Drawing Sheets

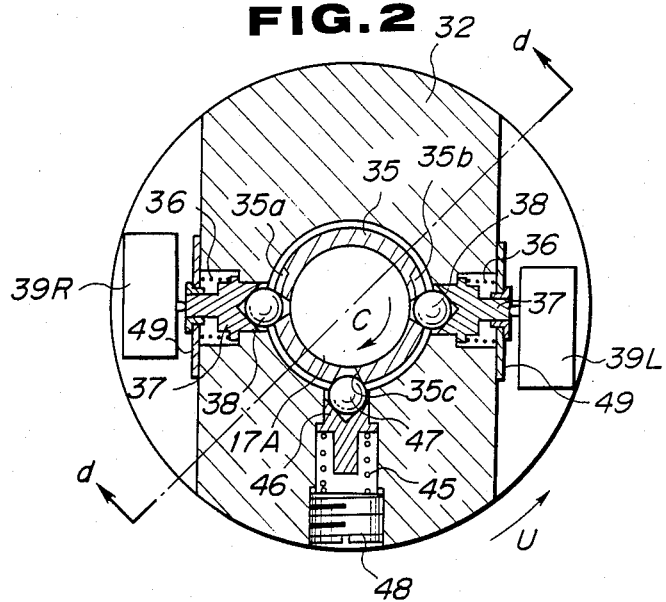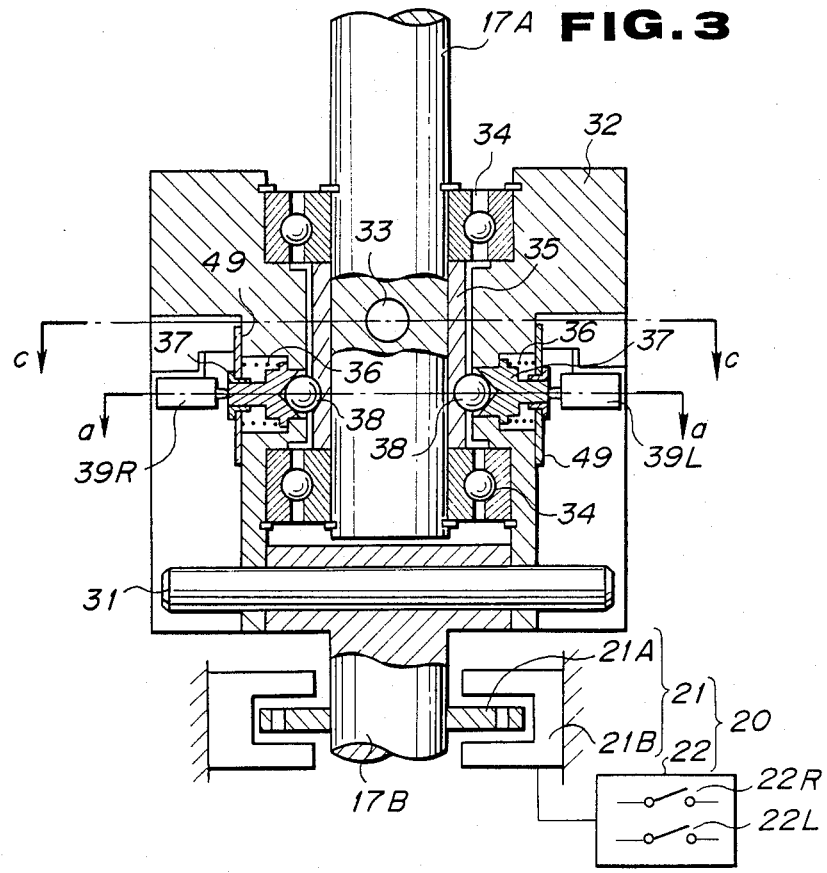

STEERING SYSTEM WITH KICKBACK CONTROL ARRANGEMENT

BACKGROUND OF THE INVENTION

The present invention relates to a steering system with a kickback control arrangement, and more particularly to a steering system with a kickback control arrangement whereby a reverse thrust from a dirigible wheel of an industrial vehicle such as a forklift truck is controlled and ill-effect on a manual steering handle thereof is prevented.

JP-UM 62-4468 discloses a steering system with a kickback control arrangement wherein the occurrence of a kickback is detected by a centrifugal governor and a limit switch assembly and an electromagnetic clutch is activated immediately after the detection of occurrence of a kickback to decelerate a manual steering handle. According to this known kickback control arrangement, a quick manipulation of the manual steering handle has been detected as occurrence of a kickback. Besides, a weak kickback or gradually proceeding kickback cannot be detected.

SUMMARY OF THE INVENTION

According to the present invention, there is provided a steering system with a kickback control arrangement, comprising:
  a dirigible wheel;
  a manual steering handle;
  means whereby the dirigible wheel is steered by the manual steering handle, the means including a force transmitting part having one end subjected to a a steering force manually imposed on the manual steering handle and an opposite end subjected to an external force imposed on the dirigible wheel;
  a first detector so constructed and arranged as to detect a deflection of the force transmitting part;
  a second detector so constructed and arranged as to detect a movement of the force transmitting part;
  a brake so constructed and arranged as to decelerate the manual steering handle; and
  a controller for activating the brake in response to a result derived from detections by the first and second detectors.

The first detector may take the form of a torque sensor and the second detector may take the form of a rotation sensor.

Preferrably, the second detector is arranged between the first detector and the dirigible wheel so that, upon occurrence of a kickback, the second detector is subjected to the kickback before the first detector is subjected to the kickback. This is effective in reducing a time lag from the occurrence of a kickback to the subsequent activation of the brake.

Preferrably, the brake is arranged between the first detector and the manual steering handle so that when the brake is activated, the ineria of the manual steering handle does not influence on the first detector.

According to one embodiment, the force transmitting part includes a first shaft and a second shaft with a sleeve. The sleeve has mounted therein means for carrying the first shaft for allowing a limited rotational movement of the first shaft relative to the second shaft in each of two rotational directions. The carrying means include a pair of axially spaced bearing securely mounted within the sleeve and in bearing contact with the first shaft at two axially spaced portions thereof, a transverse pin diametrically extending through the first shaft at a portion disposed between the two axially spaced portions with one and opposite end portions thereof projected from the first shaft, and diametrically extending opening means formed in the sleeve for receiving the one and opposite end portions of the transverse pin with a predetermined play for allowing the limited rotational movement of the first shaft relative to the second shaft in each of the two rotational directions. The first detector includes means for resiliently holding the first shaft in its central rest position relative to the second shaft, a switch actuator surrounding the first shaft between the pair of axially spaced bearings and connected thereto by the transverse pin for unitary rotation therewith. The switch actuator is formed with two cam surface portions in substantially diametrically opposed relationship, and cam followers carried by said sleeve are cooperating with the cam surface portions, and switches are carried by said sleeve to be activated by the cam followers, respectively. The force which the first shaft is resiliently held in its central rest position is adjustable by an adjustable member. Thus, if this force is set to a small value, small amount of deflection of the force transmitting part can be detected.

BRIEF DESCRIPTION OF THE DRAWINGS

FIG. 2 is a cross section of a pinion shaft assembly, as a force transmitting part, taken along the line a—a of FIG. 3;

FIG. 3 is a longitudinal section of the pinion shaft assembly;

DETAILED DESCRIPTION OF THE INVENTIONS

Referring to the accompanying drawings, and particularly to FIGS. 1 to 7, a first embodiment is described. In this embodiment, the present invention has been applied to a steering system for a forklift of the reach type.

Figure 1:
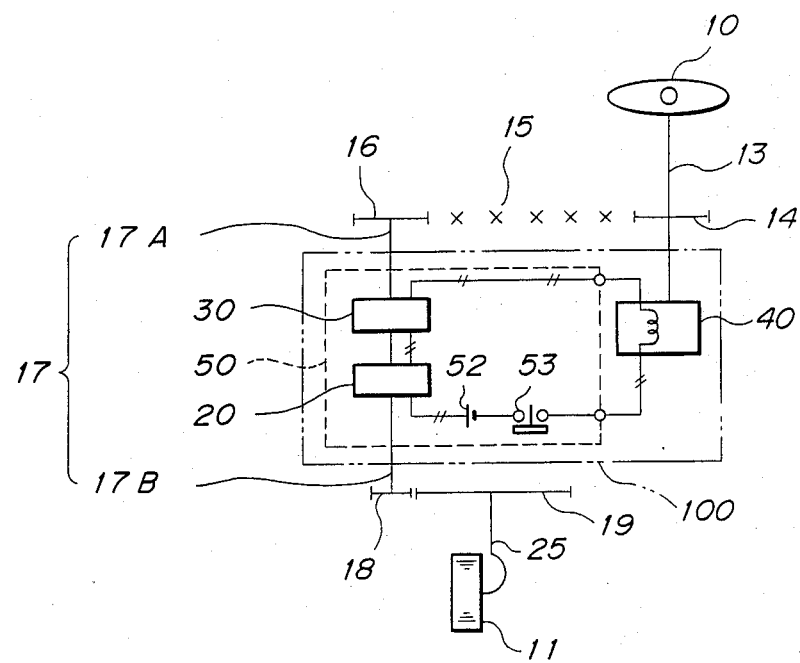
FIG. 1 is a block diagram showing a first embodiment of a steering system with a kickback control arrangement according to the present invention.

Referring to FIG. 1, the steering system comprises a manual steering handle 10, a dirigible wheel 11 and a steering force transmitting system whereby the dirigible wheel 11 is steered by the manual steering handle 10. The steering force transmitting system includes a steering shaft assembly 13, a steering shaft sprocket 14, a pinion gear shaft assembly 17, a pinion gear sprocket 16, a chain 15 operatively connected between the sprockets 14 and 16, a pinion gear 18, a ring gear 19 and a steering axle 25. The sprocket 14 is rotatable with the steering shaft assembly, while the other sprocket 16 is rotatable with the pinion shaft assembly 17. The pinion 18 is rotatable with the pinion shaft assembly 17 and in mesh with the ring gear 19. Thus, if a steering force is manually imposed on the manual steering handle 10, this steering force is transmitted to one end of the pinion shaft assembly 17 via the steering shaft assembly 14, sprocket 14, chain 16 and sprocket 16. An external force imposed on the dirigible wheel 11 such as when it rides on a protruded portion on the road is transmitted to the opposite end of the pinion shaft assembly 17 via the steering axle 25, ring gear and pinion 18.

A kickback control arrangement is encircled by a broken line drawn rectangle and designated by a reference numeral 100. The kickback control arrangement 100 comprises a first detector in the form of a torque sensor 30 which is so constructed and arranged as to detect a deflection of the pinion shaft assembly 17, a second detector in the form of a rotation sensor 20 which is so constructed and arranged as to detect a movement of the pinion shaft assembly 17, an electromagnetic brake 40 so constructed and arranged on the steering shaft assembly 13 as to decelerate the manual steering handle 10, and a controller 50 which activates the electromagnetic brake 40 upon detection of occurrence of a kickback based on output signals of the torque sensor 30 and the rotation sensor 20.

Referring to FIGS. 2 to 5, the torque sensor 30 and rotation sensor 20 are further described.

Figure 4:
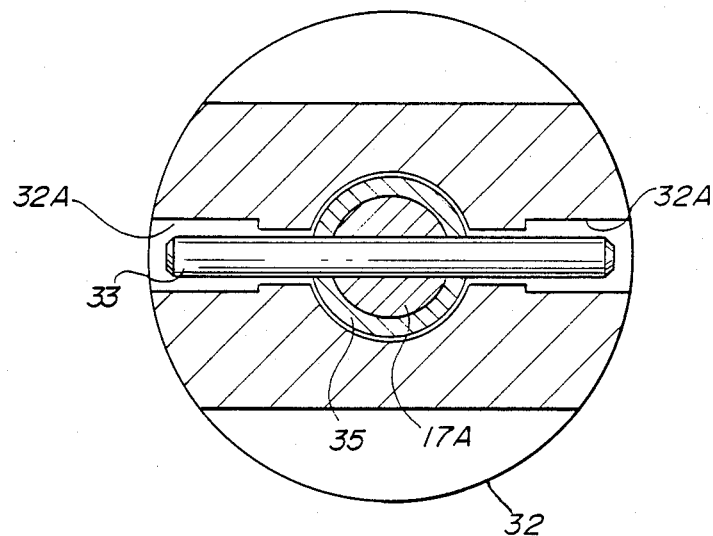
FIG. 4 is a cross section taken along the line c—c of FIG. 3.
Figure 5:
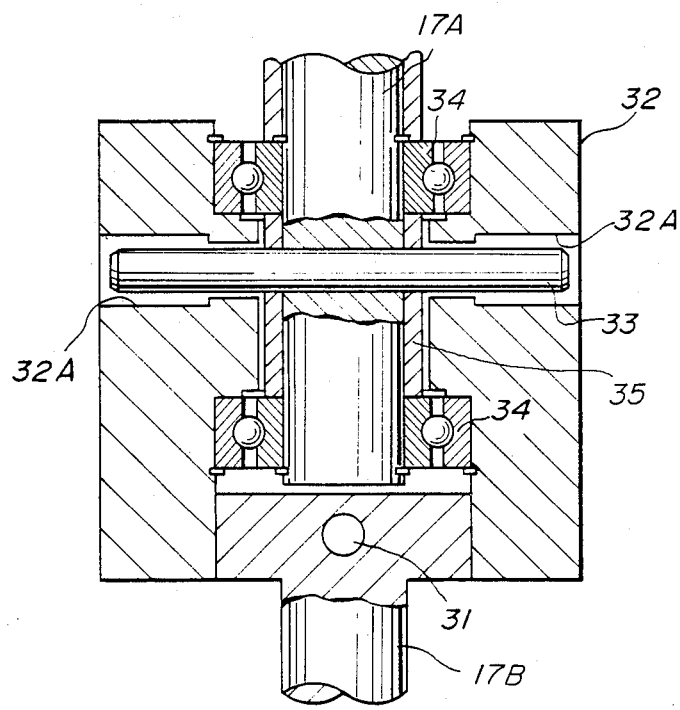
FIG. 5 is a longitudinal section taken along the line d—d of FIG.2.

As shown in FIG. 3, the pinion shaft assembly 17 includes a first or upper shaft 17A and a second or lower shaft 17B with an outer sleeve 32. With a transverse pin 31, the outer sleeve 32 is connected to the lower shaft 17B for an unitary rotation therewith. The upper shaft 17A extends into the outer sleeve 32 and carried by a pair of axially spaced bearings 34, 34 which are mounted within the outer sleeve 34 in axially tight manner and in bearing contact with the upper shaft 17A at two axially spaced portions thereof. As best seen in FIGS. 4 and 5, a transverse pin 33 diametrically extends through the upper shaft 17A at a portion disposed between the two axially spaced bearings 34, 34 with one and opposite end portions projected from the upper shaft 17A. The one and the opposite end portions of the transverse pin 33 are received by diametrically opposed opening 32A formed through the outer sleeve 32 as shown in FIGS. 4 and 5. As shown in FIG. 4, the one and the opposite end portions of the transverse pin 33 are received in the diametrically opposed openings 32A of the outer sleeve 32 with clearance so as to allow a limited rotational movement of the upper shaft 17A relative to the outer sleeve 32 and thus to the lower shaft 17B in each of two rotational directions. A switch actuator sleeve 35 surrounds the upper shaft 17A between the pair of axially spaced bearings 34, 34. This switch actuator sleeve 35 is connected to the upper shaft 17A by means of the transverse pin 33.

As shown in FIG. 2, the switch actuator sleeve 35 is formed with two cam surfaces portions 35a, 35b in substantially diametrically opposed relationship and a V detent groove 35c. Cam followers in the form of balls 38 retained by ball retainers 37 are biased by springs 36 into contact with both of the cam surface 35a, 35b, respectively. A rightward torque switch 39R held by the outer sleeve 32 is arranged at the back of one of the ball retainer 37, while a leftward torque switch 39L held by the outer sleeve 32 is arranged at the back of the other ball retainer 37. The arrangement is such that a radially outward movement of each of the retainers 37 activates to turn on the corresponding switch 39R or 39L. A detent ball 47 retained by a ball retainer 46 is biased toward the shaft axis by a spring into contact with the V groove 35c.

With the spring force of the spring 45, an allowable upper limit to a torque transmitted from the upper shaft portion 17A to the outer sleeve 32 can be set. As long as an input torque is lower than this allowable upper limit, the switches 39R, 39L remain off although the upper shaft 17A rotates integrally with the outer sleeve 32 with the switches 39R, 39L remain open.

If an input torque exceeds the allowable upper limit, the detent ball 47 is pushed outward of the V groove 35c to allow the relative rotation of the switch actuator 35 to the outer sleeve 32, causing one of the cam surfaces 35a and 35b to turn on via the corresponding ball 38 the corresponding one of the rightward and leftward torque switches 39R, 39L in accordance with a direction of such an input torque. The relative rotation between the upper shaft 17A and the outer sleeve 32 will proceed further after one of the switches 39R and 39L has been turned on until the transverse pin 33 comes into firm engagement with the outer sleeve 32. After the engagement of the transverse pin 33 with the outer sleeve 32 has been established, transmission of a power from the upper shaft 17A to the outer sleeve 32 and then to the lower shaft 17B is secured. If the input torque drops below the allowable upper limit, the bias force by the spring 45 works to cause the switch actuator 35 to restore its central rest position relative to the lower shaft 17B thereby to turn off the switches 39R, 39L.

In FIGS. 2 and 3, the reference numeral 48 designates an adjust screw for adjusting the bias force of the spring 45 and thus the allowable upper limit of a torque transmitted, and the reference numerals 49 are spring retainers for the springs 36 biasing the ball retainers 31 against their radially outward movements thereof owing to the centrifugal action.

From the preceding description it will now be understood that the upper shaft 17A is resiliently held in its central rest position relative to the lower shaft 17B by means of the V detent groove 35c, detent ball 47, ball retainer 46, spring 45 and adjust screw 48.

As shown in FIG. 3, the rotation sensor 20 includes an optical rotation sensor portion 21 and an electric circuit portion 22 which detects a forward rotation of the lower shaft 17B of the pinion shaft assembly 17 or a reverse rotation thereof based on an output signal of the optical rotation sensor 21, which signal corresponds to the forward or reverse rotation of the pinion shaft assembly 17. The optical sensor portion 21 comprises a slit plate 21A and a photo interruptor 21B, secured to a stationary portion, including a light receiving element and a light emitting element. The electric circuit portion 22 is designed to detect a forward rotation of the lower shaft 17B of the pinion shaft assembly 17 or a reverse rotation thereof based on a pulse phase which differs corresponding to the forward or reverse rotation. In concept, it has a right turn rotation switch 22R which is closed upon detecting the forward rotation of the lower shaft 17B of the pinion shaft assembly 17 and a left turn rotation switch 22L which is closed upon detecting the reverse rotation of the lower shaft 17B of the pinion shaft assembly 17.

The electromagnetic brake 40 is of the known construction and it is energized upon receipt of a drive signal to decelerate the steering shaft assembly 13 and in turn the manual steering handle 10. This drive signal is generated by the controller 50 which includes the two torque switches 39R, 39L of the above mentioned torque sensor 30 and the right and left turn switches 22R, 22L of the rotation sensor 20.

Figure 6:
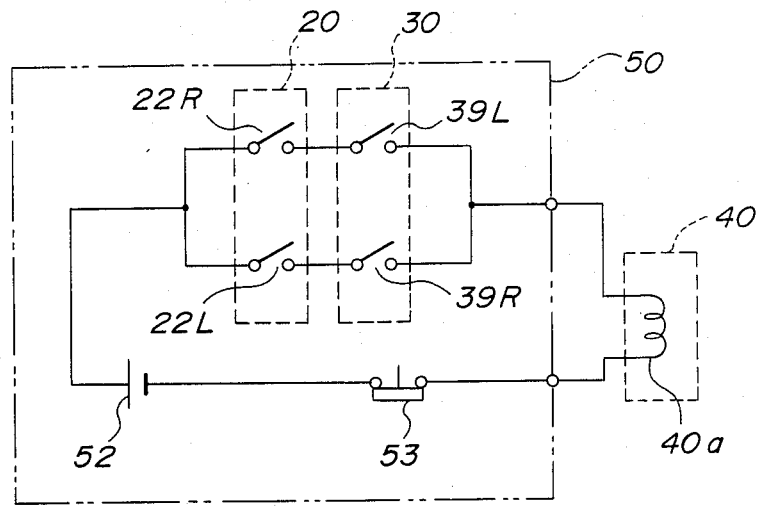
FIG. 6 is a circuit diagram illustating the function of a controller.

As shown in FIG. 6, in this controller 50, the right turn switch 22R and leftward torque switch 39L are connected in series, the left turn switch 22L and rightward torque switch 39R are connected in series, and a group of switches consisting of a pair of the series connected switches connected in parallel are disposed between a battery 52 and a solenoid coil 40a of the electromagnetic brake 40, and a manual switch 53 is provided which is arranged near a driver's seat.

The operation of the first embodiment is now explained.

Let it now be assumed that the dirigible wheel 11 rides on an edge of a protrusion on the road a kickback (a backward thrust) is applied to the lower shaft 17B of the pinion shaft assembly 17 to turn same in a leftward steering direction from the dirigible wheel 11 during right turn of the manual steering handle 10 by a driver. Then, viewing in FIG. 2, the upper shaft 17A is rotated clockwise as indicated by an arrow C, while the outer sleeve 32 is subjected to a counterclockwise rotational force as indicated by an arrow U due to the kickback applied to the lower shaft 17B. If the kickback is weaker than the steering force applied to the manual steering handle by the driver, the rotational force of the upper shaft 17A is transmitted via the switch actuator sleeve 35, detent ball 47, outer sleeve 32 and transverse pin 31 to lower shaft 17B. In this case where the kickback is weaker than the steering force, the lower shaft 17B is rotated to the right steering direction (clockwise) with the transverse pin 33 with clearances maintained in the diametrically opposed openings 32A formed in the outer sleeve 32. Thus, the torque switches 39R, 39L of the torque sensor 30 remain opened and no current passes through the solenoid coil of the electromagnetic brake 40.

If the kickback is stronger than the steering force applied to the manual steering handle 10 by the driver, a counterclockwise rotational force U (viewing in FIG. 2) applied to the outer sleeve 32 causes the detent ball 47 to get out of the V detent groove 35c, allowing the outer sleeve 32 to rotate in the counterclockwise direction, thus turning the rightward torque switch 39R on. Subsequently, the upper shaft 17A rotates in unison with the outer sleeve 32. Under this condition, since the lower shaft 17B rotates in the opposite direction to the steering direction of the upper shaft 17A, the rotation sensor 20 generates pulses corresponding to this counterclockwise rotation of the lower shaft 17B, causing the left turn switch 22L to turn on. Therefore, as will be readily understood from FIG. 6, the circuit of the controller 50 is closed, allowing electric current to pass through the solenoid coil 40a of the electromagnetic brake 40. Thus, the electromagnetic brake 40 is activated to decelerate the steering shaft assembly 13 and the manual steering handle 10 and the transmission of the kickback to the manual steering handle 10 is prevented. This results in preventing the occurrence of an event that the manual steering handle 10 is turned to the left or counterlockwise during a right turn of the manual steering handle 10 by the driver against the intention of the driver.

Verying the magnitude of the braking force by the electromagnetic brake 40 less than or greater than the magnitude of a kickback, it is possible to stop the rotation of the manual steering handle 10 immediately upon the occurrence of kickback or reduce the reverse rotation due to kickback. If desired, a reverse rotation of the manual steering handle 10 due to a small kickback can be prevented by turning the adjust screw 48 to set the bias force of the detent spring 45 to a sufficiently small value and setting the braking force by the electromagnetic brake 40 to a sufficiently large value. When the kickback reduces or disappears, the bias force of the detent spring 45 causes the switch actuator sleeve 35 to restore its central rest position relative to the outer sleeve 32, thus rendering the torque switches of the torque sensor 30 open. This cuts off the supply of electric current to the electromagnetic brake 40, thus completing a kickback control mode.

If the electromagnetic brake 40 should be activated upon occurrence of no kickback owing to supply of electric current to the electromagnetic brake 40 due to malfunction of the rotation switches 22R, 22L or torque switches 39R, 39L, the steering torque with which the manual steering handle 10 is manipulated becomes large. This inconvenience can be prevented only by manually opening the switch 53, cutting off the supply of electric current to the electromagnetic brake 40. Preferably, the braking force by the electromagnetic brake 40 is adjustable by the driver even during the kickback control mode. Of course, the braking force may be completely locked so that it can not be varied.

According to the previously described embodiment, since a kickback applied in the reverse direction to the lower shaft 17B from the dirigible wheel 11 is firstly transmitted to the rotation sensor 20 before activating the torque sensor 30, the response characteristic to kickback has been improved by making it possible to shorten a time lag from the occurrence of a kickback to the initiation of activation of the electromagnetic brake 40. Besides, since the detection of steering direction is made based on a sensor which is composed of switches, each arranged in one of steering directions, the construction of the torque sensor has been simplified, resulting in a cost reduction and an increased reliability.

If desired, the supply of electric current to the electromagnetic brake 40 can be cut off when the electric current continues to pass through the electromagnetic brake 40 exceeds a predetermined length of time. To accomplish this objective, what should be done is to replace the manual switch 53 with a timer switch which is opened when the time for which the electric current continues to pass through the electromagnetic brake 40 exceeds the predetermined length of time. The length of time for which a kickback is present, that is, the length of time for which the switches 22R and 39L are both closed or the switches 22L and 39R are both closed, is relatively short. Thus, the fact that the above-mentioned pair of switches are kept on beyond the predetermined length of time may be attributed to occurrence of some trouble. Thus, this predetermined length of time is set in the timer so that when the time for which one of the pairs of switches are kept on exceeds this predetermined length of time, the supply of electric current to the electromagnetic brake 40 is cut off.

Figure 7:
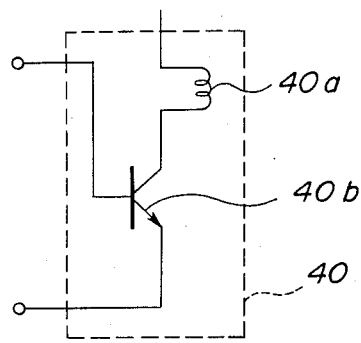
FIG. 7 is a more practical circuit of controlling energization of a coil of an electromagnetic brake.

Referring to FIG. 7, if the coil 40a of the electromagnetic brake 40 is turned on or off by the transistor 40b, the electromagnetic brake 40 is kept activated when the transistor 40b is short circuited. In order to eliminate such an inconvenience, it is preferrable to provide a well known circuit to detect the short-circuit state of the transistor 40b and replace the manual switch 53 with a switch designed to be opened upon receiving such a detect signal. If desired, an arrangement may be made to inform the operator upon occurrence of such abnormal event by producing a buzzer or intermittently turning on a warning light.

The location where the torque sensor 30 is mounted is not limited to this embodiment. The construction is not limited to this embodiment, either. For example, the detent spring 45, retainer 46 and detent ball 47 which are arranged to set the upper limit of the allowable transmission of torque may be abolished and the setting of such an upper limit may be made by the springs 36 used to bias the cam follower balls 38 against the switch actuator sleeve 35. Rather than operating the torque switches 39R, 39L via the retainers 37, the balls 38 may be arranged to operate directly the torque switches 39R, 39L using the stroke of the balls 38. Alternatively, it is possible to arrange switch actuator pieces of the torque switches 39R, 39L in bearing contact with the cam surface portions 35a, 35b of the switch actuator sleeve 35. The torque sensor may be constructed of the well known strain gauge type or the magnetic type. Although the electromagnetic brake 40 is used to decelerate the steering shaft 13 in the previously described embodiment, it is possible to decelerate the other suitable portion which the manual steering handle 10 is connected to. The electromagnetic brake 40 may be replaced with a hydraulic fluid pressure actuator. More specifically, a gear is coupled on the pinion shaft assembly 17 and in mush with another gear coupled with an output shaft of a hydraulic motor such that usually inlet and outlet ports of the hydraulic motor are allowed to communicate with each other to allow free rotation of the motor, while when braking is required, an electromagnetic change over valve with an orifice included is activated to apply fluidic resistance to the rotation of the hydraulic motor thereby to decelerate the gear on the pinion shaft assembly 17.

Figure 8:
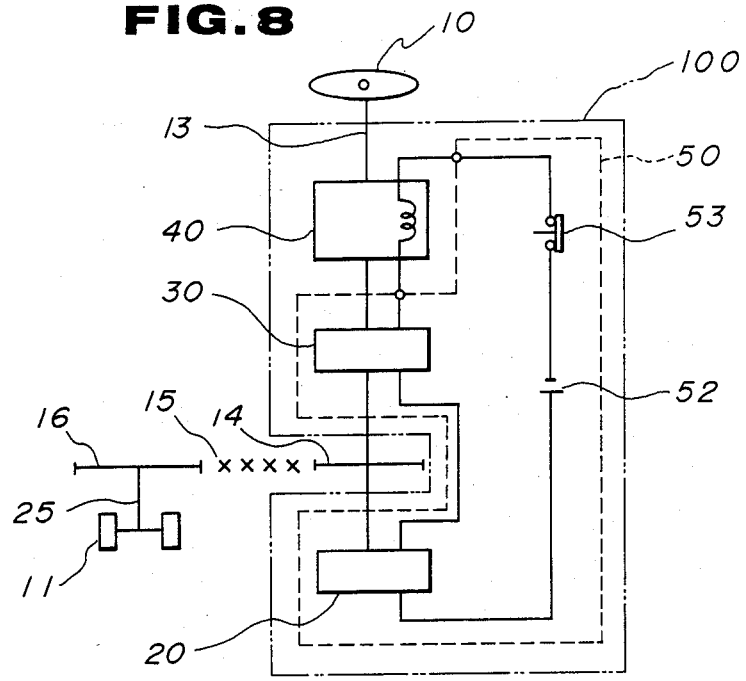
FIG. 8 is a block diagram showing a second embodiment where the present invention has been applied to a steering system for a tractor.

Referring to FIG. 8, there is shown an embodiment where the present invention is applied to a steering system for a tractor.

A steering force on the handle 10 is transmitted via a steering force transmitting system to a pair of dirigible wheels 11. The steering force transmitting system comprises a steering shaft assembly 13, a steering shaft sprocket 14, a chain 15, a sprocket 16, and a steering axle 25. Provided on the steering shaft assembly 13 are an electromagnetic brake 40, a torque sensor 30, a rotation sensor 20 in this order from the manual steering handle 10. They are inteconnected in the same manner as the controller 50 shown in FIG. 6 so that a kickback detection and the electromagnetic brake 40 is activated in the same mode as that of the previously described embodiment.

From the above description it will now be understood that since this steering system does not includes a pinion shaft assembly, the steering shaft assembly 13 serves as a force transmitting part where the torque sensor 30 and rotation sensor 20 are arranged on. Besides, the electromagnetic brake 40 is arranged on the steering shaft assembly between the manual steering handle 10 and the torque sensor 30.

Figure 9:
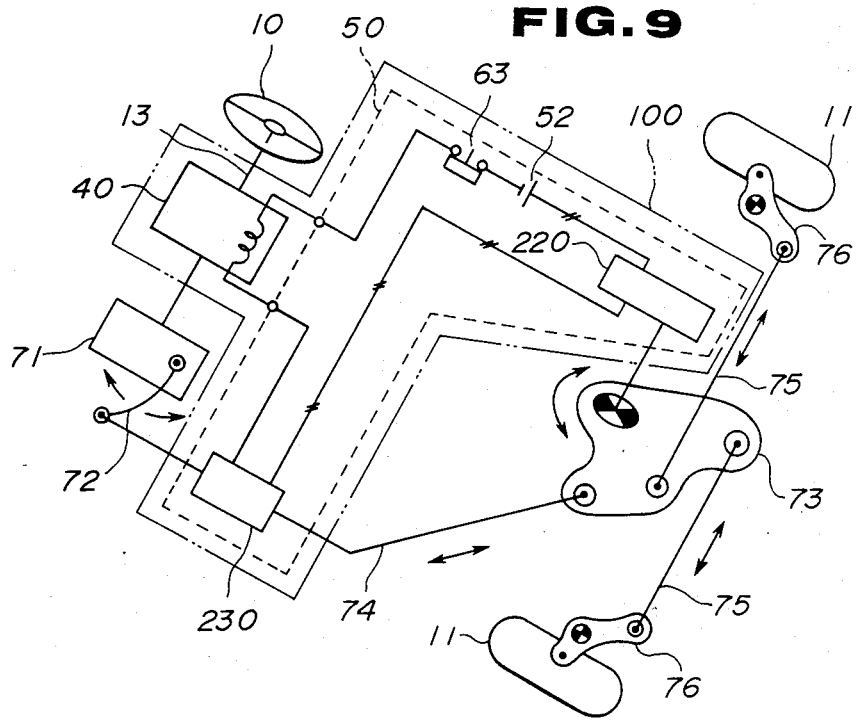
FIG. 9 is a block diagram showing a third embodiment where the present invention has been applied to a steering system for a forklift truck of the counter type.

Referring to FIG. 9, there is shown still another embodiment wherein the present invention is applied to a steering system for a forklift of the counter type. In this case, as shown in FIG. 9, there is provided an electromagnetic brake 40 on a steering shaft assembly 13 and there is provided a steering force direction sensor 230 on a drag link 74 operatively disposed between a swing arm 72, which converts a rotational output of a steering gearbox 71 into a linear motion, and a bell crank 73 to transmit such a linear motion from the former to the latter. Arranged on the shaft of the bell crank 74 is a rotation sensor 220. The steering force direction sensor 230 is a kind of an axial force sensor which is composed of a strain gauge attached on the outer surface of the drag link 74 and detects compression or strain thereof in order to detect the steering force applied to a manual steering handle 10. In this embodiment, an electromagnetic brake 40 may be arranged on the drag link 74 which makes a liner movement. In FIG. 9, the reference numeral 75 designates a tie rod, and 76 designates a knuckle arm.

Figure 10:
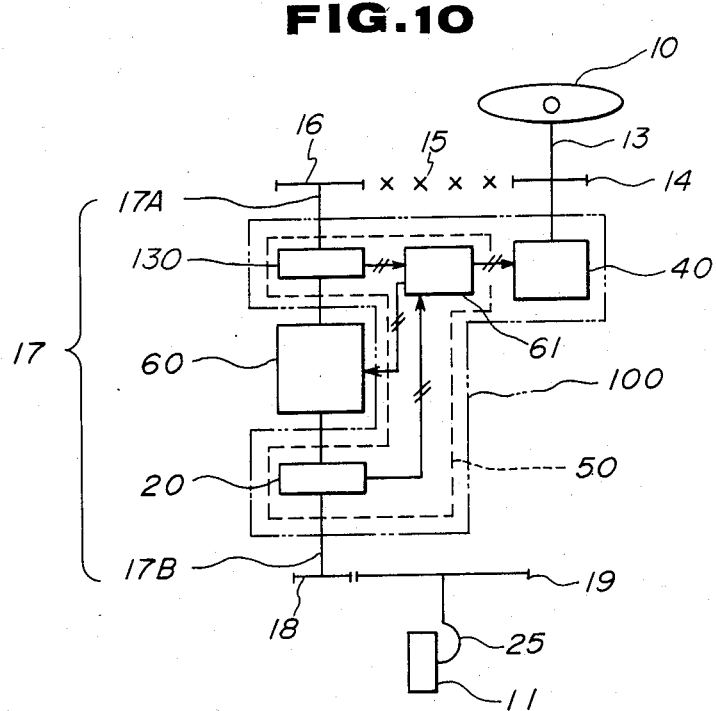
FIG. 10 is a block diagram showing a fourth embodiment where the present invention has been applied to a power steering system for a forklift truck of the reach type.

The present invention may be applied to an electric power steering system as shown in FIG. 10.

In a conventional electric power steering system, there is no particularly kickback control arrangement, since an electromotive force opposed to a steering force due to a kickback is generated as long as a manual steering handle is gripped by a driver. Thus, a reaction force upon kickback is opposed to a driving force of an electric motor for the power steering, causing an excessive current to pass through the motor, creating a problem that energy consumption is extremely great.

In the case of a forklift turck which has a pair of dirigible rear wheels or a single dirigible rear wheel, if an driver takes his hands off a manual steering handle when the handle is displaced from its neutral center position during turning of the vehicle, there occurs a phenomenon that the manual steering handle is turned automatically in the same direction as the vehicle is turned.

An electric power steering system with a kickback control arrangement shown in FIG. 10 is designed to solve these problems.

The same reference numerals as used in FIG. 1 are used also in FIG. 10 to designate similar or like parts or portions in order to omit detailed explanation.

Arranged on a steering shaft assembly 13 is an electromagnetic brake 40. A pinion shaft assembly 17 is divided into an upper shaft 17A and a lower shaft 17B. Provided on the upper shaft 17A is a torque sensor 130, while provided on the lower shaft 17B is a rotation sensor 20. The upper shaft 17A and lower shaft 17B are connected with each other via an electric motor 60.

The torque sensor 130 is different from the above mentioned torque sensor 30 in that it detects not only the direction of a torque but also the magnitude thereof. For example, it may take the form of a well known torque sensor of the strain gauge type.

In this embodiment, the direction of rotation of the electric motor 60 and the magnitude of output torque produced by the electric motor 60 are determined based on the magnitude and direction of torque detected by the torque sensor 130 in order to produce a power assist applied to the lower shaft 17B of the pinion shaft assembly 17. The output signals of the torque sensor 130 and rotation sensor 20 are fed to a controller 61 where it is determined that a kickback has occurred when the direction of torque and the direction of rotation are in the opposite relationship. The electromagnetic brake 40 is activated in response to an output signal of the controller 61 in the same manner as that of the previously described embodiments and it decelerates the steering shaft assembly 13.

As a result, there occurs no excessive current passing through the electric motor 60 upon occurrence of a kickback, contributing to energy saving. Beside, the above mentioned uncomfortable phenomenon which otherwise occurs when the driver hands off the manual steering handle 10 during turning of the vehicle is prevented.

If it is not desired to eliminate the excessive current passing through the motor upon occurrence of a kickback and it is only desired to eliminate the above mentioned uncomfortable phenomenon of the manual steering handle, the electromagnetic brake 40 can be abolished. In this case, the electric motor 60 produces a torque opposed to a torque due to a kickback. Since, in this case, the torque rotation sensor 20 is arranged between the torque sensor 130 and the dirigible wheel 11, a time lag from the occurrence of a kickback to the control of the kickback by the electric motor 60 is shortened.

Figure 11:
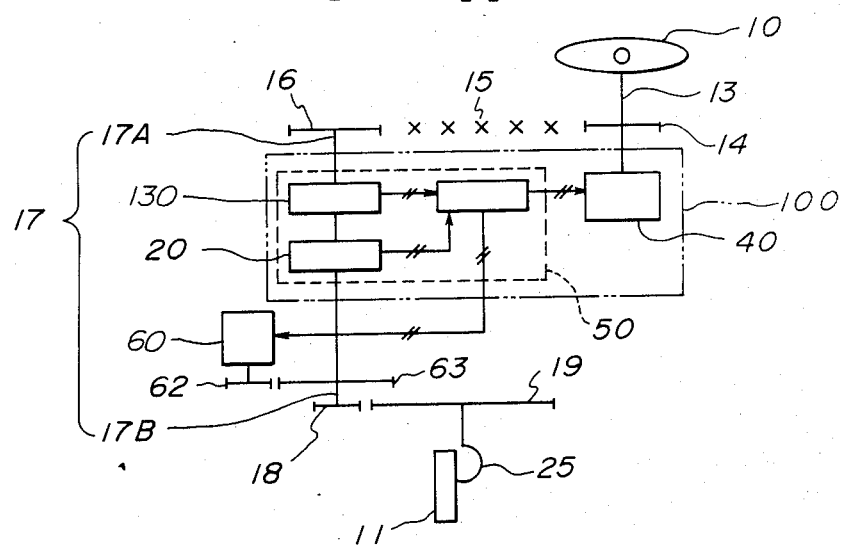
FIG. 11 is a block diagram showing a fifth embodiment where the present invention has been applied to a power steering system for a forklift truck of the reach type.
Figure 12:
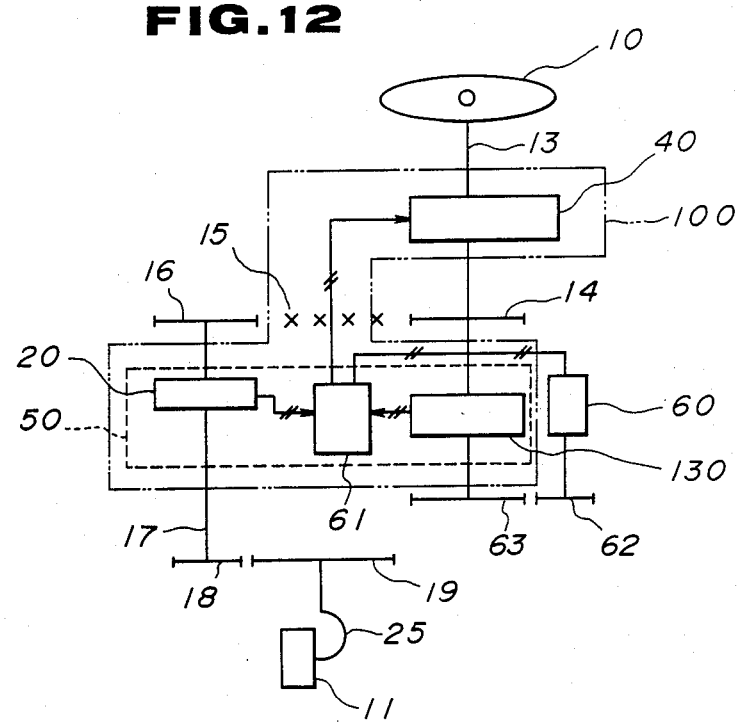
FIG. 12 is a block diagram showing a sixth embodiment where the present invention has been applied to a power steering system for a forklift truck of the reach type.
Figure 13:
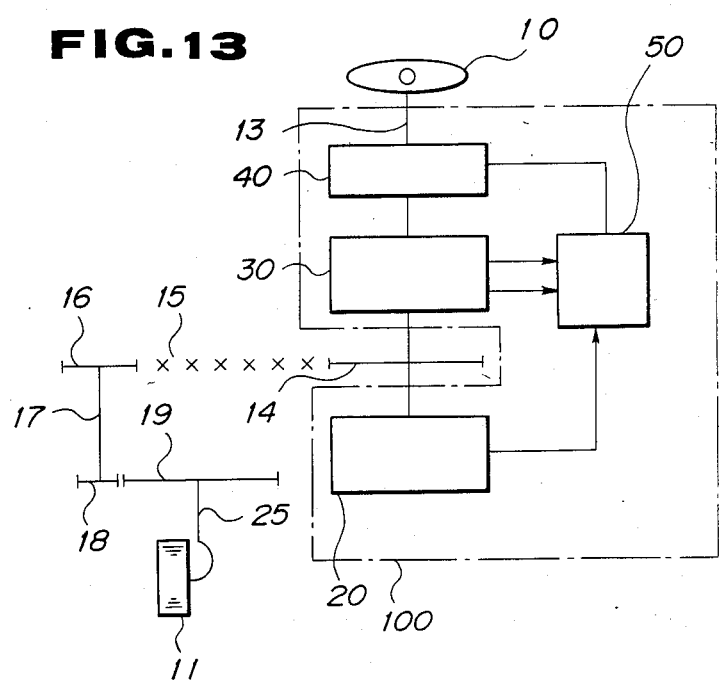
FIG. 13 is a block diagram showing a seventh embodiment of steering system with a kickback control arrangement according to the present invention.

Referring to FIGS. 11 and 12, two embodiments where the present invention has been applied to an electric power steering system for a forklift truck of the reach type are described.

In the case of the embodiment shown in FIG. 11, an electric power steering motor 60 is provided in a separate manner from a pinion shaft assembly 17 such that the output of the motor 60 is transmitted via gears 62 and 63 to the pinion shaft assembly 17.

In the case of the embodiment shown in FIG. 12, an electromagnetic brake 40 and a torque sensor 130 are arranged on a steering shaft assembly 13, while a rotation sensor 20 is arranged on a pinion shaft assembly 17. An electric power steering motor 60 is drivingly connected via gears 62 and 63 to the steering shaft assembly 13 so that the motor output is transmitted via these gears 62 and 63 to the steering shaft assembly 13.

Referring to FIGS. 13 to 18, a further embodiment according to the present invention is described. This embodiment is substantially the same as the previously described embodiment shown in FIG. 8 except that the present invention is applied to a steering system for a forklift truck of the counter type in this embodiment, whereas the present invention is applied to a steering system for a tractor. This embodiment is substantially the same as the first embodiment shown in FIGS. 1 to 5 in many respects so that the same references are used to designate like or similar parts through FIGS. 1 to 5 and through FIGS. 13 to 17. This embodiment is different from the first embodiment mainly in that a torque sensor 30 and a rotation sensor 20 are arranged on a steering shaft assembly 13, and an electromagnetic brake 40 is arranged on the steering shaft assembly 13 between the torque sensor 30 and a manual steering handle 10.

Referring to FIGS. 14 to 17, the torque sensor 30, rotation sensor 20 and electromagnetic brake 40 are further described.

Figure 15:
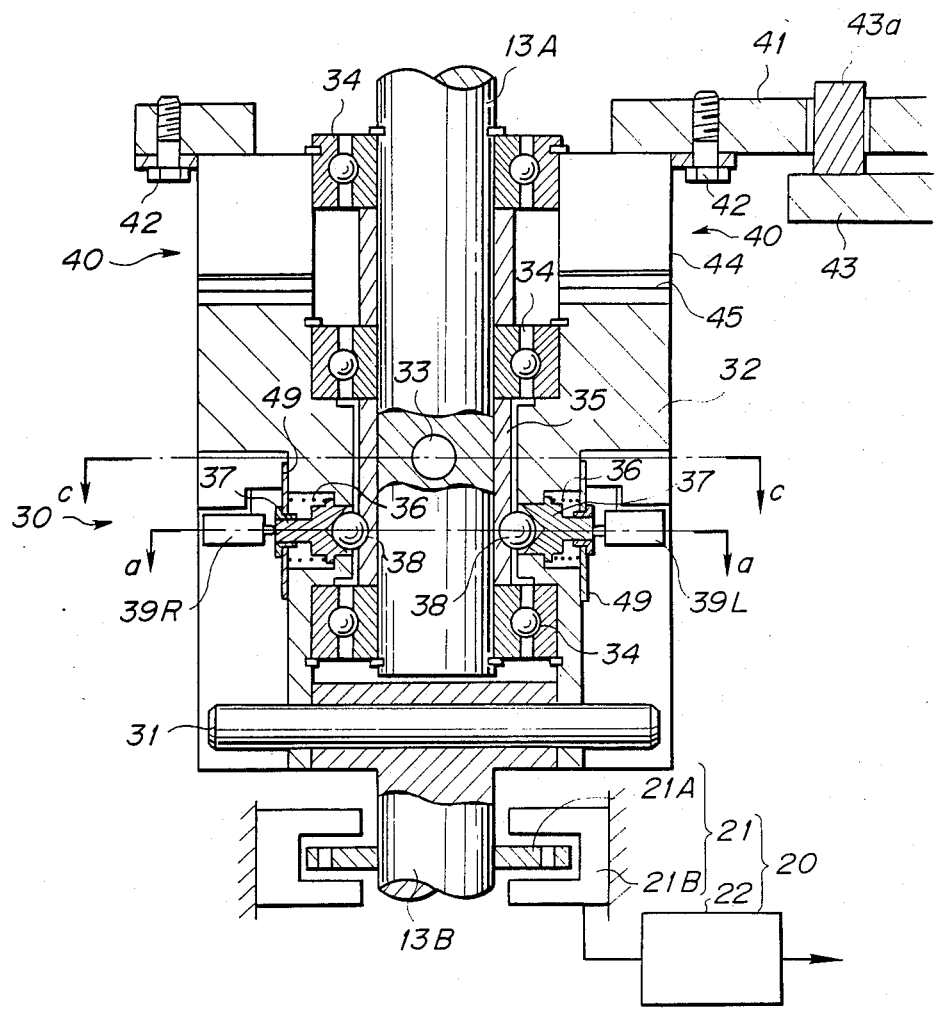
FIG. 15 is a longitudinal section of the steering shaft assembly.
Figure 16:
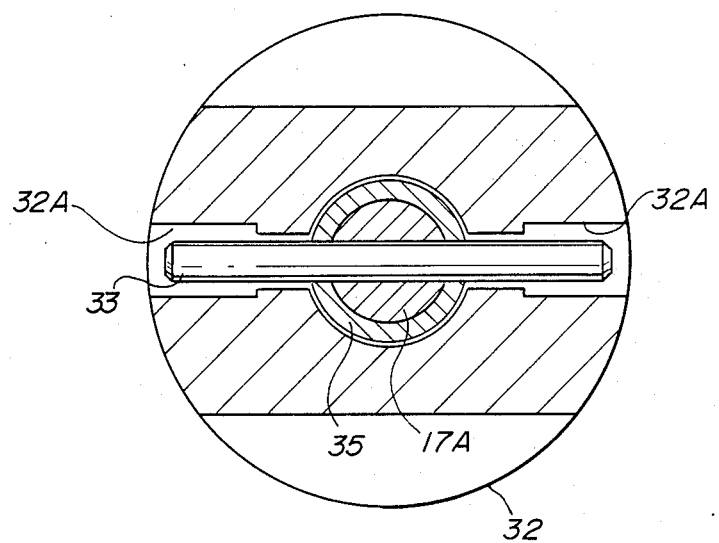
FIG. 16 is a cross section taken along the line c—c of FIG. 15.
Figure 17:
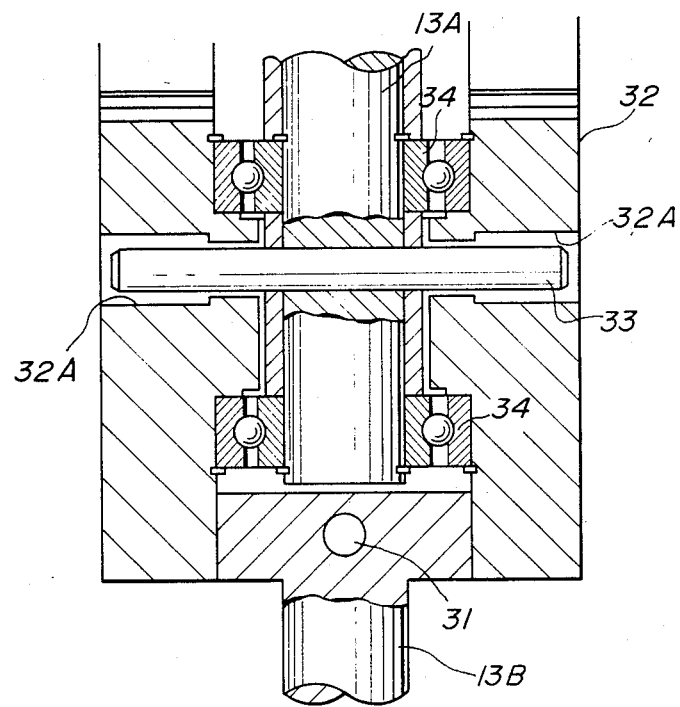
FIG. 17 is a longitudinal section taken along the line d—d of FIG. 14.

As shown in FIG. 15, the steering shaft assembly 13 includes a first or upper shaft 13A and a second or lower shaft 13B with an outer sleeve 32. With a transverse pin 31, the outer sleeve 32 is connected to the lower shaft 13B for an unitary rotation therewith. The upper shaft 13A extends into the outer sleeve 32 and carried by three axially spaced bearings 34, 34, 34 which are mounted within the outer sleeve 34 in axially tight manner and in bearing contact with the upper shaft 13A at three axially spaced portions thereof. As best seen in FIGS. 16 and 17, a transverse pin 33 diametrically extends through the upper shaft 13A at a portion disposed between the lower two axially spaced bearings 34, 34 (viewing in FIG. 15) with one and opposite end portions projected from the upper shaft 13A. The one and the opposite end portions of the transverse pin 33 are received by diametrically opposed openings 32A formed through the outer sleeve 32 as shown in FIGS. 16 and 17. As shown in FIG. 16, the one and the opposite end portions of the transverse pin 33 are received in the diametrically opposed openings 32A of the outer sleeve 32 with clearances so as to allow a limited rotational movement of the upper shaft 13A relative to the outer sleeve 32 and thus to the lower shaft 13B in each of two rotational directions. A switch actuator sleeve 35 surrounds the upper shaft 17A between the lower two axially spaced bearings 34, 34. This switch actuator sleeve 35 is connected to the upper shaft 13A by means of the transverse pin 33.

Figure 14:
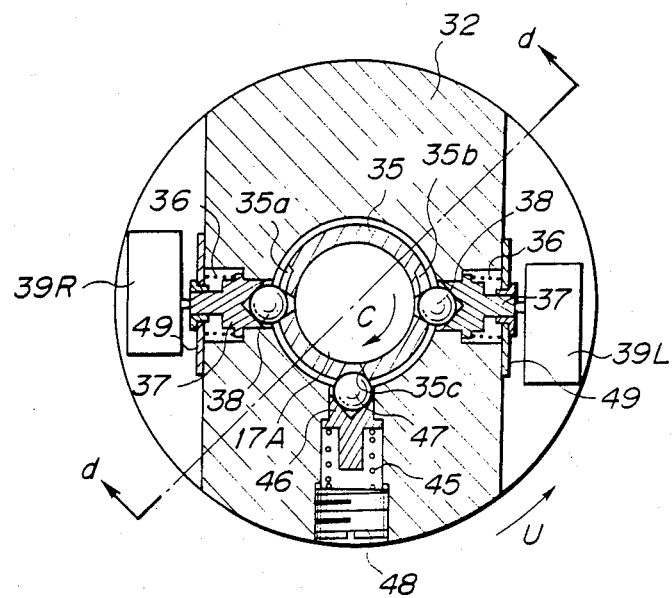
FIG. 14 is a cross section of a steering shaft assembly, as a force transmitting part, taken along the line a—a of FIG. 15.

As shown in FIG. 14, the switch actuator sleeve 35 is formed with two cam surfaces portions 35a, 35b in substantially diametrically opposed relationship and a V detent groove 35c. Cam followers in the form of balls 38 retained by ball retainers 37 are biased by springs 36 into contact with both of the cam surfaces 35a, 35b, respectively. A rightward torque switch 39R held by the outer sleeve 32 is arranged at the back of one of the ball retainer 37, while a leftward torque switch 39L held by the outer sleeve 32 is arranged at the back of the other ball retainer 37. The arrangement is such that a radially outward movement of each of the retainers 37 activates to turn on the corresponding switch 39R or 39L. A detent ball 47 retained by a ball retainer 46 is biased toward the shaft axis by a spring into contact with the V groove 35c.

The torque sensor 30 operates in substantially the same manner as the torque sensor used in the first embodiment.

As shown in FIG. 15, the rotation sensor 20 includes an optical rotation sensor portion 21 and an electric circuit portion 22 which detects a forward rotation of the lower shaft 13B of the steering shaft assembly 13 or a reverse rotation thereof based on an output signal of the optical rotation sensor 21, which signal corresponds to the forward or reverse rotation of the steering shaft assembly 13. The optical sensor portion 21 comprises a slit plate 21A and a photo interruptor 21B, secured to a stationary portion, including a light receiving element and a light emitting element. The electric circuit portion 22 is designed to detect a forward rotation the lower shaft 13B of the steering shaft assembly 13 or a reverse rotation thereof based on a pulse phase which differs corresponding to the forward or reverse rotation. Besides, it detects the magnitude of speed of rotation of the lower shaft 13B and genератges a positive analog signal or a negative analog signal besed on the direction and magnitude of rotation of the lower shaft 13B of the steering shaft assembly 13. In this embodiment, a positive electric voltage is generated upon detecting a right turn rotation of the lower shaft 13B, while a negative electric voltage is generated upon detecting a left turn rotation of the lower shaft 13B. The magnitude of the electric voltage is proportional to the magnitude of the rotation of the lower shaft 13B of the steering shaft assembly 13.

Referring to FIG. 15, the electromagnetic brake 40 is secured via bolts 42 to a bracket 41 and arranged around the upper shaft 13A via the top bearing 34 (viewing in FIG. 15). The bracket 41 is held against rotation by means of a pin 43a projected from a stationary bracket 43. Alternatively, the bracket 41 is secured directly to the vehicle frame. The electromagnetic brake 40 includes an electromagnet 44 and an armature 45. The electromagnet 44 is fixed relative to the bracket 41 and thus held stationary, while the armature 45 is fixedly secured via screw threaded engagment to the upper axial end (viewing in FIG. 15) of the outer sleeve 32. When electric current is allowed to pass through the electromagnetic brake 40, the electromagnet 44 draws the armature, thus decelerating the outer sleeve 32, the lower shaft 13B and the upper shaft 13A. This braking force disappears when the electric current passing through the electromagnetic brake 40 is cut off. The supply of or cut off of electric current passing through the electromagnetic brake 40 is controlled in response to the output of the controller 50 shown in FIG. 18.

Figure 18:
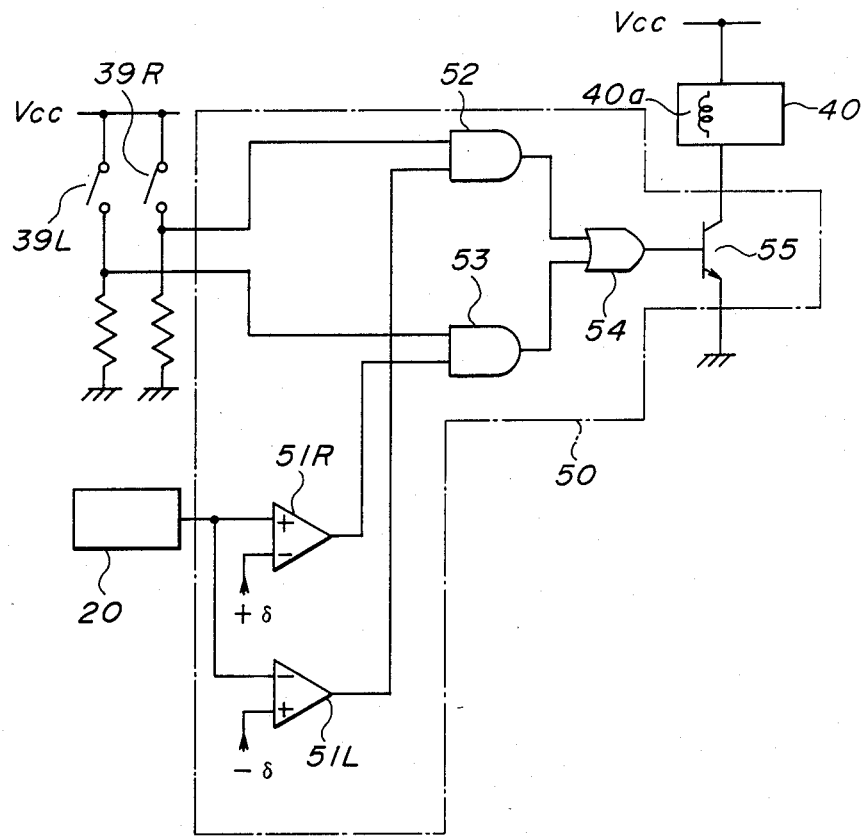
FIG. 18 is a circuit diagram illustrating the function of a controller.

Referring to the controller 50 shown in FIG. 18, the rotation sensor 20 is connected to one input terminal of each of two comparators 51R and 51L. Two reference values are supplied to the other input terminals of the two comparators 51R and 51L. Output terminals of the comparators 51R and 51L are connected to two AND gates 52 and 53 on their one input terminals, respectively. Connected to the other input terminals of the AND gates 52 and 53 are the torque switches 39R and 39L. The setting is made such that when one of the torque switches 39R and 39L is closed, a logical one is applied to the corresponding AND gate 52 or 53. Output terminals of the AND gates 52 and 53 are connected to input terminals of an OR gate 54 which has its output terminal connected to a base of a transistor 55. When the transistor 55 is rendered on, the electromagnetic brake 40 is activated, while when the transistor 55 is rendered off, the electromagnetic brake is deactivated or released.

Let us now consider the case where the rightward torque switch 39R is closed owing to a movement of the outer sleeve 32 caused by a counterclockwise torque U applied thereto. When the torque switch 39R is closed, a logical one is applied to the one input terminal of the AND gate 52. When the upper shaft 13B start rotating counterclockwise as viewed in FIG. 14 owing to this kickback, the rotational sensor 20 generates a negative electric voltage having a magnitude proportional to the magnitude of this counterclockwise rotation. If this negative electric voltage is less than a reference value $-\delta$ (minus delta), the output of the AND gate 52 changes to a logical one. This causes the OR gate 54 to render the transistor 55 on. As a result, the electromagnetic brake 40 is activated to decelerate the steering shaft assembly 13 and the manual steering handle 10.

When subsequently the magnitude of this counterclockwise rotation of the lower shaft 13B of the steering shaft assembly 13 decreases, the output of the comparator 51L changes to a logical zero, causing the output of the AND gate 52 to change to a logical zero, rendering the transistor 55 off.

Since, according to this embodiment, the electromagnetic brake 40 is arranged between the torque sensor 30 and the manual steering handle 10, the torque sensor 30 is completely isolated by the electromagnetic brake 40 from the influence due to the inertia moment of the manual steering handle 10 during a kickback control mode. This assures continuous operation of the electromagnetic brake 40 during the kickback control mode.

Figure 19:
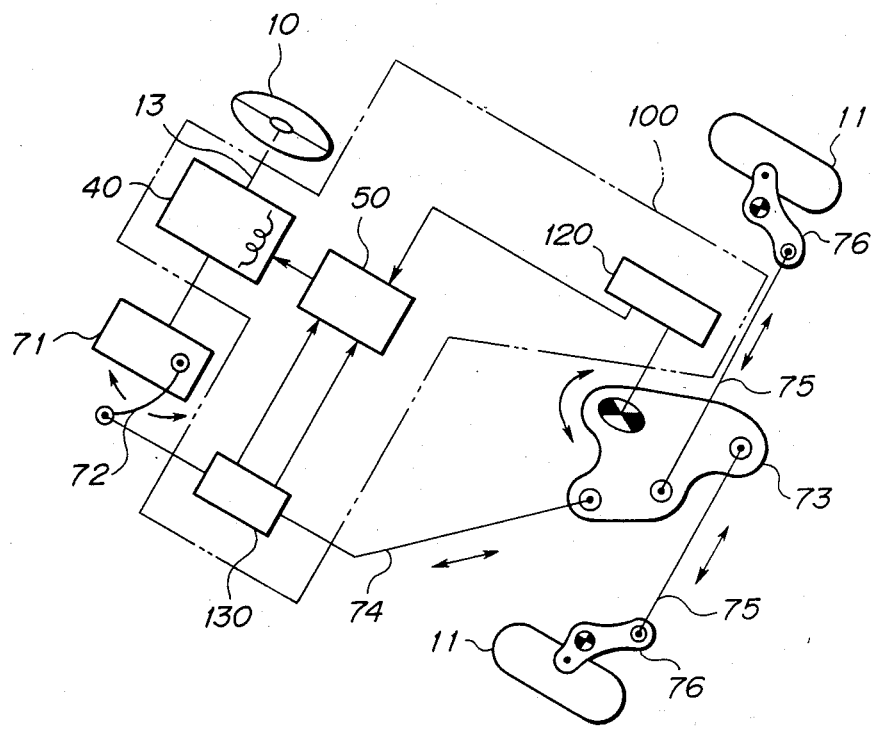
FIG. 19 is a block diagram of an eighth embodiment where the present invention has been applied to a steering system for a forklift truck of the counter type.

Referring to FIG. 19, there is shown another embodiment where the present invention is applied to a steering system for a forklift truck of the counter type. As shown in FIG. 19, a steering torque direction sensor 130 is arranged around a drag link 74. This sensor 130 is in the form an axial force sensor with a strain gauge attached on the drag link to detect the steerting torque by detecting compression or tension of the outer surface of the drag link 72. A rotation sensor 120 is arranged on the shaft of a bell crank 73. This embodiment is substantially the same as the previously described embodiment shown in FIG. 9.

Figure 20:
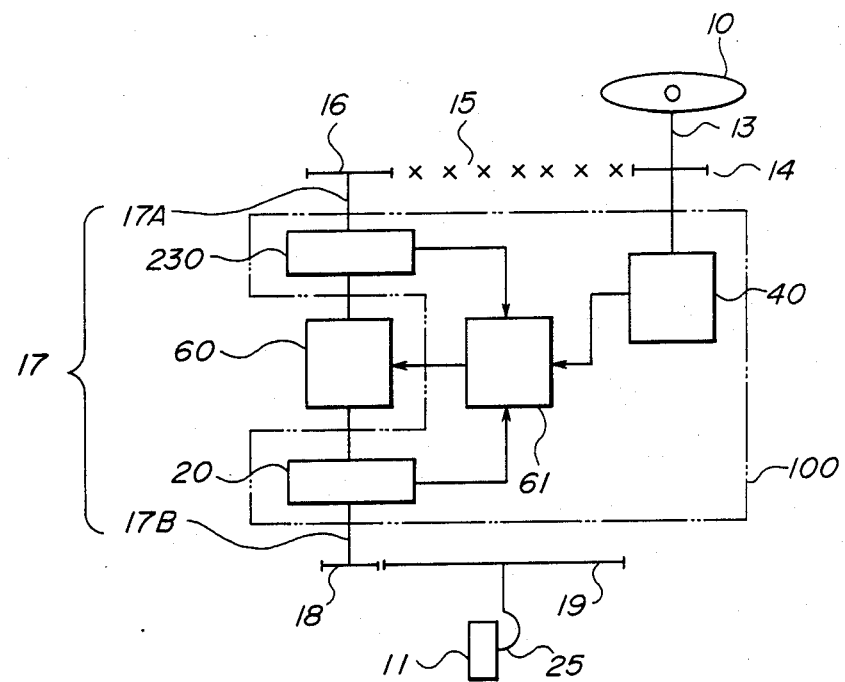
FIG. 20 is a block diagram of a ninth embodiment where the present invention has been applied to a power steering system for a forklift truck of the reach type.

Referring to FIG. 12, there is shown the last embodiment where the present invention is applied to an electric power steering system for the reach type. This embodiment is substantially the same as the previously described embodiment as shown in FIG. 10. As shown in FIG. 20, a torque sensor 230 is arranged on an upper shaft 17A of a pinion shaft assembly 17. This torque sensor 130 is different from the torque sensor 30 in that it is in the form of a well known torque sensor of the strain gauge type which can detect not only the direction of a torque but also the magnitude thereof. Similarly to the previously described embodiment shown in FIG. 10, an electric power steering motor 60 is controlled based on the direction of and the magnitude of the torque detected by the torque sensor 230.

What is claimed is:

1. A steering system with a kickback control arrangement, comprising:
   a dirigible wheel;
   a manual steering handle;
   means whereby said dirigible wheel is steered by said manual steering handle, said means including a force transmitting part having one end subjected to a steering force manually imposed on said manual steering handle and an opposite end subjected to an external force imposed on said dirigible wheel;

a first detector configured to detect a direction of a deflection of said force transmitting part;

a second detector configured to detect a direction of a movement of said force transmitting part;

a brake configured to decelerate said manual steering handle; and a controller for activating said brake in response to a result derived from detections by said first and second detectors.

2. A steering system with a kickback control arrangement as claimed in claim 1, said force transmitting part includes a first shaft and a second shaft with a sleeve, said sleeve having mounted therein means for carrying said first shaft for allowing a limited rotational movement of said first shaft relative to said second shaft in each of two rotational directions.

3. A steering system with a kickback control as claimed in claim 2, wherein said carrying means include a pair of axially spaced bearings securely mounted within said sleeve and in bearing contact with said first shaft at two axially spaced portions thereof, a transverse pin diametrically extending through said first shaft at a portion disposed between said two axially spaced portions with one and opposite end portions thereof projected from said first shaft, and diametrically extending opening means formed in said sleeve for receiving said one and opposite end portions of said transverse pin with a predetermined play for allowing said limited rotational movement of said first shaft relative to said second shaft in each of said two rotational directions.

4. A steering system with a kickback control arrangement as claimed in claim 3, wherein said first detector includes means for resiliently holding said first shaft in its central rest position relative to said second shaft, a switch actuator surrounding said first shaft between said pair of axially spaced bearings and connected thereto by said transverse pin for unitary rotation therewith, said switch actuator being formed with cam surface portions in substantially diametrically opposed relationship, and wherein said first detector also includes cam followers cooperating with said cam surface portions and carried by said sleeve, and switches carried by said sleeve to be activated by said cam followers, respectively.

5. A steering system with a kickback control arrangement as claimed in claim 4, wherein said first shaft is subjected to said steering force imposed on said manual steering handle and said second shaft is subjected to said external force imposed on said dirigible wheel, and wherein said second detector is arranged to detect a direction of movement of said second shaft.

6. A steering system with a kickback control arrangement as claimed in claim 5, wherein said brake is arranged to decelerate said first shaft.

7. A steering system with a kickback control arrangement as claimed in claim 1, wherein said second detector is arranged between said first detector and said dirigible wheel.

8. A steering system with a kickback control arrangement as claimed in claim 7, wherein said brake is arranged between said first detector and said manual steering handle.

9. A steering system with a kickback control arrangement as claimed in claim 1, wherein said brake is arranged between said first detector and said manual steering handle.

10. A steering system with a kickback control arrangement, comprising:

a dirigible wheel;

a manual steering handle;

means whereby said dirigible wheel is steered by said manual steering handle, said means including a force transmitting part having one end subjected to a steering force manually imposed on said manual steering handle and an opposite end subjected to an external force imposed on said dirigible wheel;

a first detector configured to detect a direction of a torque which said force transmitting part is subjected to;

a second detector configured to detect a direction of a movement which said force transmitting part is subjected to;

a brake configured to decelerate said manual steering handle; and a controller for activating said brake when said directions detected by said first and second detectors are opposed to each other.

* * * * *